United States Patent [19]
Bydalek

[11] Patent Number: 5,959,964
[45] Date of Patent: Sep. 28, 1999

[54] COMPUTER DISK AND AUDIO COMPACT DISK STORAGE WITH A PLURALITY OF RIBS EXTENDING IN FROM UPRIGHT WALLS

[76] Inventor: Edward Bydalek, 41 Northcote Rd., Brentwood, Mo. 63144

[21] Appl. No.: 07/971,274

[22] Filed: Nov. 4, 1992

[51] Int. Cl.[6] .............................. G11B 23/03; G11B 3/70; B65D 85/57
[52] U.S. Cl. ........................................ 369/291; 206/307.1
[58] Field of Search .................................. 369/77.2, 291, 369/36; 206/307–313, 387, 444; 211/41, 113

[56] References Cited

U.S. PATENT DOCUMENTS

| | | | |
|---|---|---|---|
| 4,327,831 | 5/1982 | Inaba et al. | 206/313 |
| 4,476,983 | 10/1984 | Fast | 211/113 |
| 4,550,355 | 10/1985 | Larson et al. | 360/133 |
| 4,620,630 | 11/1986 | Moss | 206/313 |
| 4,883,175 | 11/1989 | Thiele et al. | 206/387 |
| 5,090,561 | 2/1992 | Spector | 206/313 |
| 5,097,955 | 3/1992 | Kluter et al. | 206/387 |
| 5,101,972 | 4/1992 | Hunt et al. | 206/309 |
| 5,136,563 | 8/1992 | Takemasa et al. | 369/77.1 |
| 5,175,726 | 12/1992 | Imokawa | 369/291 |

*Primary Examiner*—George Joseph Letscher
*Attorney, Agent, or Firm*—Polster, Lieder, Woodruff & Lucchesi, L.C.

[57] ABSTRACT

A computer disk and audio compact disk holder includes an integral frame having a base and upright walls, the tops of said upright walls being substantially coplanar. A recess is defined by the base and upright walls, the recess being disposed below the tops of the upright walls and above the base. The walls are disposed such that they retain a computer disk or audio compact disk disposed in the recess in place therein. The frame further includes attachment structure for removably securing the frame to other structures or devices. The holder may be used to display a computer disk or audio compact disk for sale, as well as in combination with a storage system for storing a plurality of computer disks. The disk holder may be constructed to receive computer disks of three different sizes, the particular size used in a particular holder being at the discretion of the user.

21 Claims, 4 Drawing Sheets

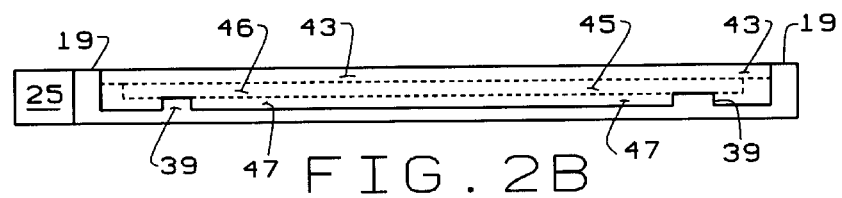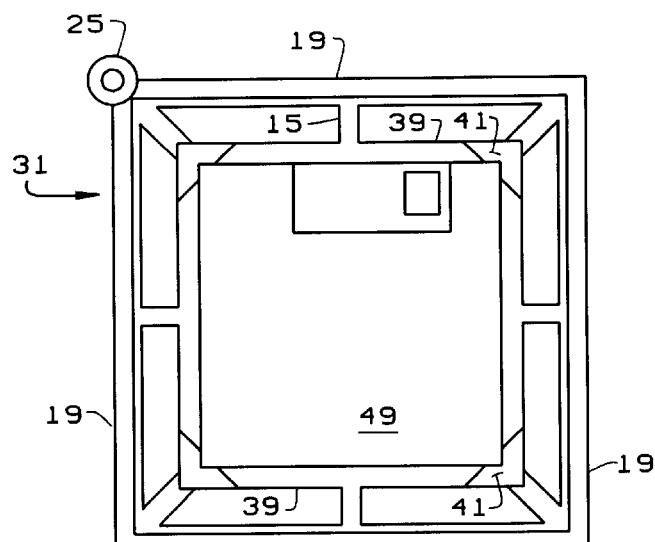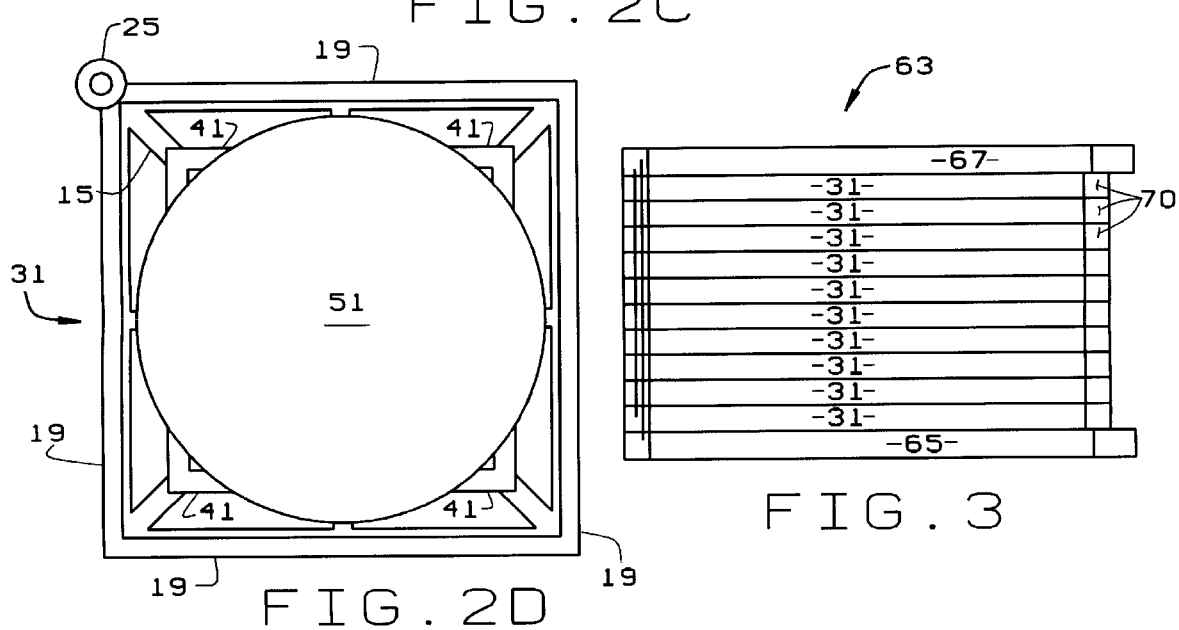

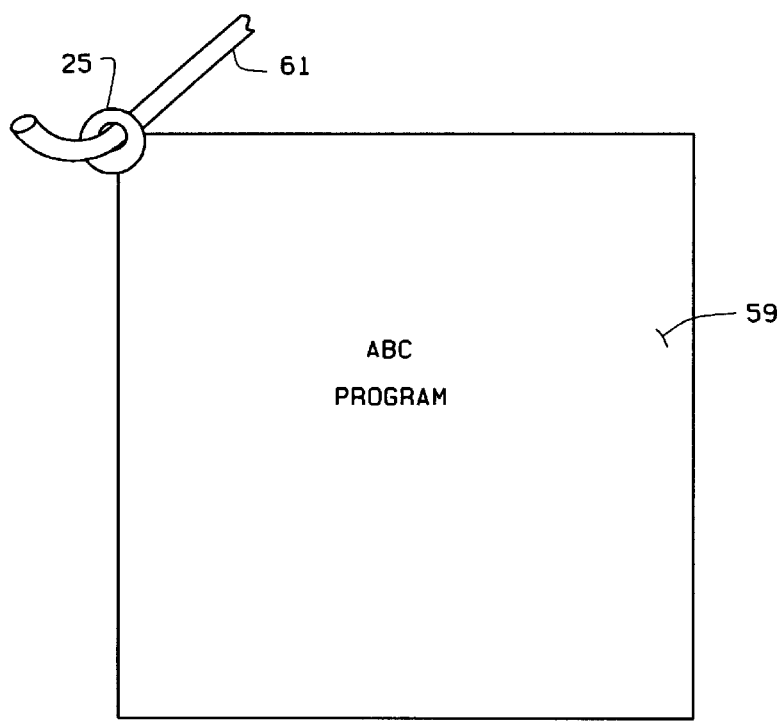
FIG. 4
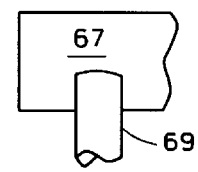
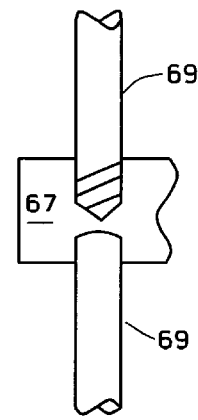
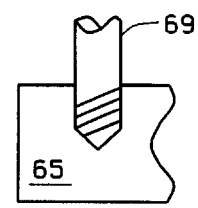
FIG. 5
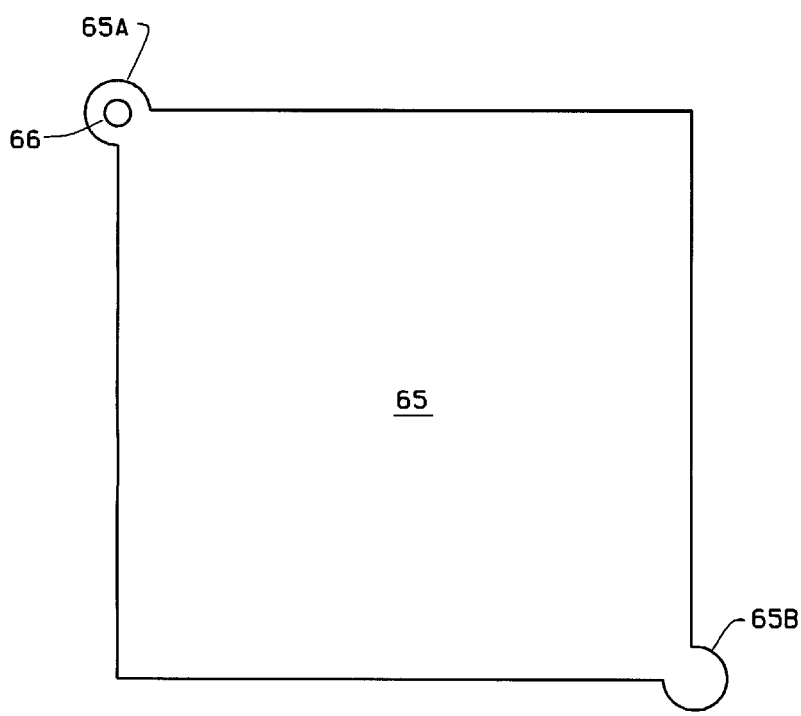
FIG. 6

COMPUTER DISK AND AUDIO COMPACT DISK STORAGE WITH A PLURALITY OF RIBS EXTENDING IN FROM UPRIGHT WALLS

BACKGROUND OF THE INVENTION

This invention relates generally to computer media and compact disk audio media, and more particularly to holders and storage systems for computer disks of various sizes and to holders and storage systems for audio compact disks.

Computer programs, particularly for personal computers, are sold on computer disks of various formats or sizes. Three typical disk formats are commonly known as 5¼", 3½", and CD-rom. It should be appreciated that these formats differ not only in shape (the CD-rom disks are round, the 5¼" disks are square, and the 3½" disks are rectangular) but also in size. This difference in shape and size creates difficulties for the retailer and the end user. The retailer must provide display space for (at least) three different sizes and shapes of disks, and the end user must find suitable storage space for the various types of disks usable with his or her computer.

The retailer's difficulties are solved, to an extent, by the fact that the manufacturer's of computer programs typically package the program disks in boxes or overwrap packages, so that the programs can be uniformly displayed. This packaging, however, does little to solve the end users' problems of storing the program disks, since the overwrap material is generally not reusable and the boxes are too bulky to be used for long-term storage of the programs. Of course, similar problems arise in the case of audio compact disks.

The end users' requirements have been addressed by the provision of separate disk holding boxes, generally made of hard plastic. These boxes are sized to accommodate a large number of disks (for example, twelve to fifty or so), but they could be improved. For example, the disk holding boxes are generally designed for a single format or size of disk, so that it is not always possible to store disks of different sizes in the same box. Even if a large size box is used, sufficient in size to hold disks of all three formats, the smaller disks are at risk of being overlooked when stored in among the larger disks.

The available disk holding boxes could also be improved in other ways. For example, these boxes typically have a hinged lid which swings upwardly from the back of the box to allow access to the disks contained in the box. This requires a significant amount of room, which is not always readily available. Moreover, if more than one box is being used, the boxes are often stacked on top of each other to reduce deskspace requirements. As a result, it is impossible with these presently available systems to open a lower box to retrieve a disk without removing the boxes stacked above it.

SUMMARY OF THE INVENTION

Among the various objects and features of the present invention may be noted the provision of a computer disk and/or audio compact disk holder which facilitates the presentation of computer programs and audio compact disks for sale to the end user.

A second object is the provision of such a computer disk and/or audio compact disk holder which is usable with computer disks and/or audio compact disks of different sizes and shapes.

A third object is the provision of such a computer disk and/or audio compact disk holder which is usable by both the retailer and end user to hold and store computer disks and/or audio compact disks.

A fourth object is the provision of such a computer disk and/or audio compact disk holder which prevents the possibility of smaller computer disks being lost among larger ones.

A fifth object is the provision of a computer disk and/or audio compact disk storage system which reduces deskspace or storage space requirements.

A sixth object is the provision of such a storage system which maintains all computer disk and/or audio compact disks readily available.

Other objects and features will be in part apparent and in part pointed out hereinafter.

Briefly, a disk holder for computer and audio disks of the present invention mechanically retains a computer disk and/or audio compact disk in place in the holder. It includes an integral frame having a base and upright walls. The tops of the upright walls are substantially coplanar and define, in combination with the base, a recess surrounded by the upright walls. The recess is disposed below the tops of the upright walls and above the base, the walls being disposed such that they retain a computer disk and/or audio compact disk disposed in the recess in place. The frame further includes attachment structure for removably securing the frame to various articles such as a display hook in a retail store or the storage system disclosed below.

The storage system of the present invention is designed for storing a plurality of computer disk and/or audio compact disks. It includes a foundation member, a plurality of computer disk and/or audio compact disk holders forming a stack, and a cover member. Each computer disk and/or audio compact disk holder has an integral frame with a base and upright walls, the tops of the upright walls being substantially coplanar and defining, with the base, a recess surrounded by the upright walls. The recess is disposed below the tops of the upright walls and above the base. The walls are disposed such that they retain a computer disk and/or audio compact disk disposed in the recess in place. The system includes structure for removably securing each computer disk and/or audio compact disk holder to the foundation member to form a stack of computer disk and/or audio compact disk holders removably secured between the foundation member and the cover member.

BRIEF DESCRIPTION OF THE DRAWINGS

FIG. 2A is a cross-sectional view, on an enlarged scale, taken along line 2A—2A of the disk holder of FIG. 2;

FIG. 2B is a simplified view corresponding to FIG. 2A, illustrating various recesses for computer disk and/or audio compact disks in the holder of FIG. 2;

FIG. 2C is a top plan of the disk holder of FIG. 2 with a disk retained therein;

FIG. 2D is a top plan of the disk holder of FIG. 2 with another disk retained therein;

FIG. 3 is a front elevation of a disk storage system of the present invention;

FIG. 4 is a perspective view of the disk holder of the present invention used in displaying a computer program for sale;

FIG. 5 is an exploded view with parts removed for clarity illustrating expansion of the disk storage system of FIG. 3;

FIG. 6 is a top plan of the base of the disk storage system of the present invention;

Similar reference characters indicate similar parts throughout the various views of the drawings.

DESCRIPTION OF THE PREFERRED EMBODIMENTS

Figure 1:
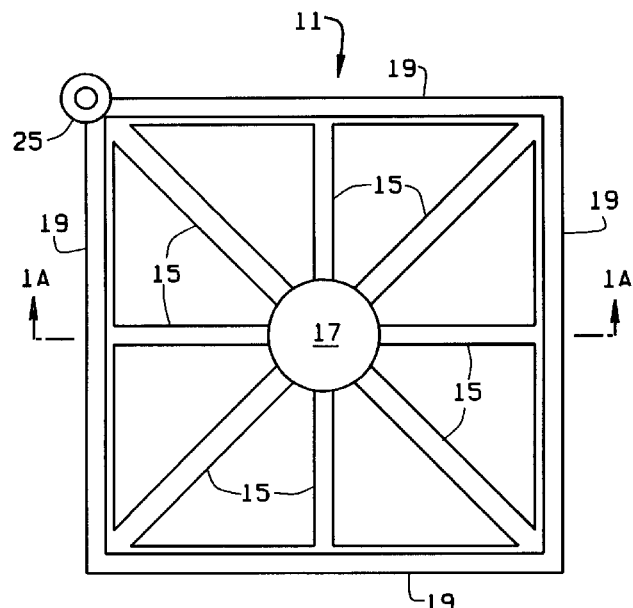
FIG. 1 is a top plan of a first embodiment of a disk holder of the present invention.
Figure 2:
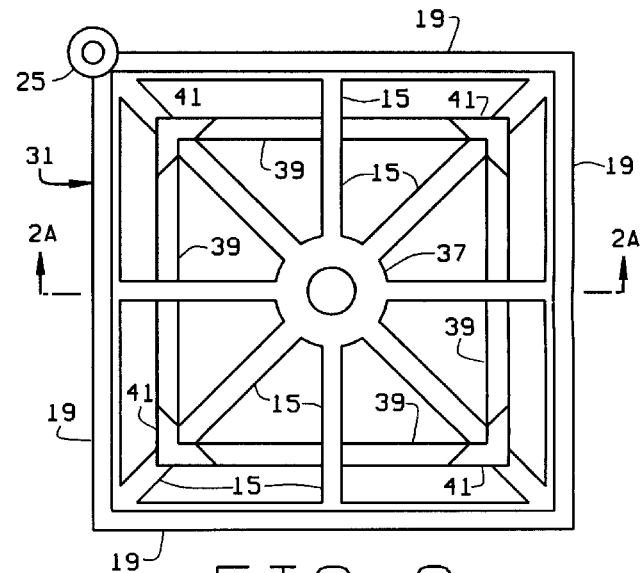
FIG. 2 is a top plan of a second embodiment of a disk holder of the present invention.
Figure 7:
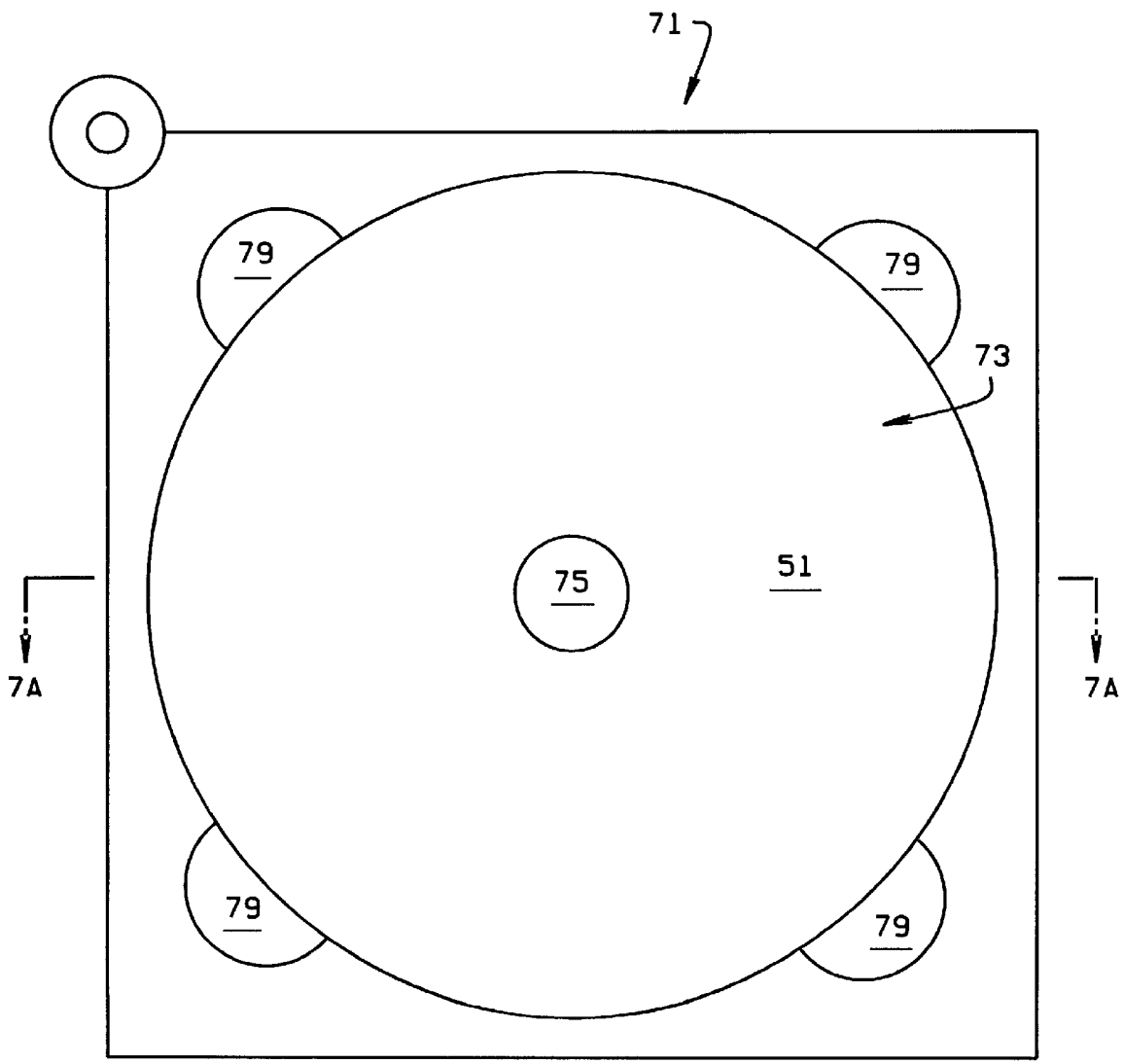
FIG. 7 is a top plan of a CD-rom or audio compact disk holder of the present invention.

Turning to the drawings, the two primary components of the present invention are a computer disk and/or audio compact disk holder (three embodiments of which are shown in FIGS. 1, 2 and 7) and a storage system (shown in FIG. 3) which uses the disk holders of FIGS. 1, 2 and 7 as a part thereof.

Figure 1A:
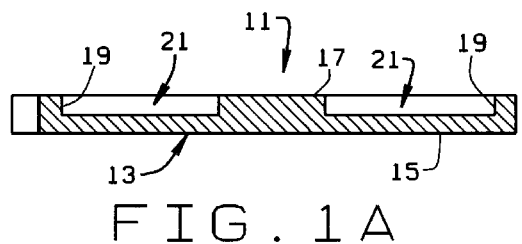
FIG. 1A is a cross-sectional view taken along line 1A—1A of the disk holder of FIG. 1.

Referring specifically to FIG. 1, a computer disk holder 11 of the present invention is designed to mechanically retain a computer disk. Although the present invention is not limited to use with any particular size disk, for purposes of explanation, the disk holder of FIG. 1 is explained in connection with holding a 5¼" computer disk. Holder 11 is integrally formed, such as from a suitable injection moldable plastic, as a single piece or frame. The frame has a base 13 (see FIG. 1A) formed by a plurality of ribs 15 radiating from a central hub 17. The ribs terminate in four upright walls 19 which extend upwardly from base 13 and terminate in a plane which defines the top of disk holder 11. As can best be seen in FIG. 1A, base 13 and walls 19 form a recess 21 which extends around hub 17. Recess 21 is sized to accept a 5¼" computer disk therein for display and storage.

Figure 1B:
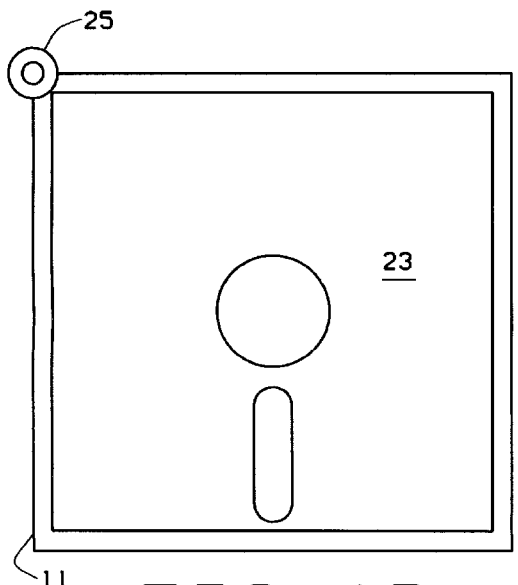
FIG. 1B is a top plan of the disk holder of FIG. 1 with a disk retained therein.

It is preferred that walls 19 and recess 21 be sized and dimensioned such that a 5¼" disk "snaps" into place in the recess, so that no additional securing mechanism is required. FIG. 1B illustrates holder 11 with a 5¼" disk 23 snapped into place. Turning back to FIG. 1, holder 11 also includes means 25 for removably securing the holder to either the storage system of FIG. 3 or to a retail sale display, all as described below.

More particularly, disk holder 11 preferably has exterior dimensions of approximately 5⅝"×5⅝"×3/16". A tubular member integrally formed on the corner where two walls 19 intersect forms attachment means 25, the orifice through the tubular member allowing a rod or wire to pass therethrough for securing the disk holder to various structures. Tubular member 25 is substantially the same height as the rest of disk holder 11, namely 3/16", has an exterior radius of 11/32", and an interior radius of ⅛".

Ribs 15 are 9/64" high, as compared to the 3/16" total height of the disk holder. This difference defines the depth of recess 21. The outer dimensions of the recess are defined by the width of walls 19, namely 3/16", thereby defining a square recess 21 approximately 5¼" on a side. Thus, a 5¼" disk fits securely inside the boundaries created by walls 19. The diameter of hub 17 is chosen to correspond to the opening in the center of 5¼" disks to retain the disk tightly within the disk holder.

Turning to FIG. 2, a computer disk and/or audio compact disk holder 31 is shown which not only holds 5¼" disks, but also 3½" disks and cd-rom and audio compact disks. The overall construction of disk holder 31 is similar to that of disk holder 11, but it also includes an inner structure for accommodating 3½" and cd-rom and audio compact disks. These disks, like the 5¼" disks, snap into place in the holder.

The inner construction of disk holder 31 is best understood by examining FIGS. 2 and 2A together. The hub, labelled 37 in this embodiment, does not extend above base 13 but rather is level therewith. Disposed above ribs 15, which form the base, is a secondary frame made up of four walls 39. These walls terminate well short of the plane defined by the tops of exterior walls 19 and provide a recess for a 3½" disk. Disposed above walls 39, at the intersections of each pair of walls 39, are four corner pieces 41 which define the recess for a cd-rom or audio compact disk. The various recesses of disk holder 31 are best illustrated in FIG. 2B, a simplified version of FIG. 2A. These recesses are labelled recess 43 for the 5¼" disk, recess 45 for the cd-rom or audio compact disk, and recess 47 for the 3½" disk.

The exterior dimensions of disk holder 31 are identical to those of holder 11 (5⅝"×5⅝"×3/16"). The walls making up the frame for the 3½" disk recess are centered in the outer frame made up of walls 19. The exterior dimensions of the inner frame are approximately 4¼"×4 1/16"×3/64, and the width of walls 39 is approximately ¼", so that the interior dimensions of the inner frame measure approximately 3¾"×3 9/16"×3/64", substantially the dimensions of a 3½" disk. Thus, a 3½" disk fits securely within the rim used in the second layer. A 3½" disk 49 is shown disposed in recess 47 in FIG. 2C.

Corner pieces 41, although they do not completely surround recess 45, define that recess for a cd-rom or audio compact disk. Each corner piece is comprised of two segments or legs that are joined to create a 90 degree angle. Each corner piece has a height of approximately 3/64" and a width of ¼". The exterior length of a leg of a corner piece is approximately 1" while the interior length of a leg measures approximately 5/16". These differing lengths are necessary since the ends of each leg must be curved as shown in FIG. 2 to accommodate the circular shape of a cd-rom or audio compact disk. A cd-rom or audio compact disk 51 fits tightly within the boundaries created by the third layer, as shown in FIG. 2D.

As mentioned above, disk holders 11 and 31 can be used for packaging computer disk and/or audio compact disks as well as storing them. For example, to package computer disk and/or audio compact disks, a disk is snapped into a computer disk and/or audio compact disk holder such as holder 11 or holder 31 as appropriate. A cardboard cover 59 (FIG. 4) is then typically placed on the top and bottom of the disk holder for additional protection of the disk. The cardboard generally will contain advertising and identifying material concerning the enclosed computer disk and/or audio compact disk. The cardboard and disk holder are then shrink wrapped to secure the packaging. Such a package can easily be displayed by the retailer on a standard merchandise hook 61 as shown in FIG. 4.

The purchaser of the computer disk and/or audio compact disk does not discard the computer disk and/or audio compact disk holder, but rather uses it in conjunction with the storage system 63 shown in FIG. 3. The storage system shown in FIG. 3 is an initial storage module, which can be expanded as described below. The initial storage module 63 is capable of storing up to ten computer disk and/or audio compact disk holders (ten holders 31 are shown in FIG. 3). The storage capacity can be increased by attaching expansion storage modules onto the initial storage module as indicated in FIG. 5. Each expansion module is also capable of holding ten computer disk and/or audio compact disk holders.

Initial storage module 63 consists of a base or foundation member 65 (preferably plastic) (see FIGS. 3 and 6) and a cover 67 (also preferably plastic) that are connected by a metal rod 69 (see FIG. 5) which is threaded on one end and smooth on the other. Base 65 is preferably padded on the bottom so that it can be placed in a horizontal position on a desk top. The base can also be mounted on a wall in a vertical position. The base is approximately 5⅝"×5⅝"×½" with the addition of small cylindrical extensions 65A and 65B at two diagonal corners of the square base. These cylindrical extensions have a height of ½" and a diameter of $^{11}/_{16}$". In the center of one extension, corresponding to securing member 25, is a threaded hole 66 with a radius approximately equal to ⅛".

The threaded end of the metal rod 69 screws into this hole in base 65. To store a computer disk and/or audio compact disk holder 11 or 31, rod 69 is placed through the hole in securing member 25 of the holder. The computer disk and/or audio compact disk holders rest on base 65 of the storage module. A rod can accommodate up to ten computer disk and/or audio compact disk holders. The smooth end of the metal rod is inserted into a hole in the bottom side of the cover 67 of the storage module.

The size and shape of cover 67 are essentially identical to the base. The distinguishing feature between the base and cover is that the cover serves a dual purpose, acting not only as the cover for the initial storage module but also as the base for the next expansion storage module, as illustrated in FIG. 5. To implement this dual function, one of the extensions in the cover has two holes, one on the bottom of the extension and the other on the top. Each hole has an ⅛" radius. The bottom hole is smooth and the top hole is threaded. As noted above, the smooth end of the rod used in the initial storage module is inserted into the bottom hole of the cover. The top hole acts as an expansion slot that allows for the possibility of screwing an additional rod into the cover to create an expansion storage module.

When the initial storage module reaches full capacity, an expansion storage module can be attached to the top of the initial storage module by screwing the threaded end of a second metal rod into this top hole. A cover which is identical to the one used in the initial storage module is slipped onto the smooth end of the second metal rod. The expansion storage module is capable of holding ten additional computer disk and/or audio compact disk holders. This expansion process can be repeated as needed to accommodate additional computer disk and/or audio compact disk holders by attaching an additional expansion storage module to the top of any expansion storage module which is already attached to the storage device.

No matter how many modules are used, the disks contained in the holders are accessed by rotating the desired disk holder out from underneath the other disks and removing it from the disk holder. To identify the disk inside a particular holder, tabs are attached to the outer edge of the disk holder by the user. Notches 70 (see FIG. 3) are provided for this purpose. Since the notches are relatively small, an index can be provided on bottom 65 or top 67 (or on any other suitable structure) for more fully identifying the particular computer disk and/or audio compact disk retained in a specific holder 11 or 31.

Other methods of identifying the disks could also be used. For example, a label measuring 5⅝"×³⁄₁₆" could be inserted into a clear plastic jacket attached to the outer edge of the disk holder.

Figure 7A:
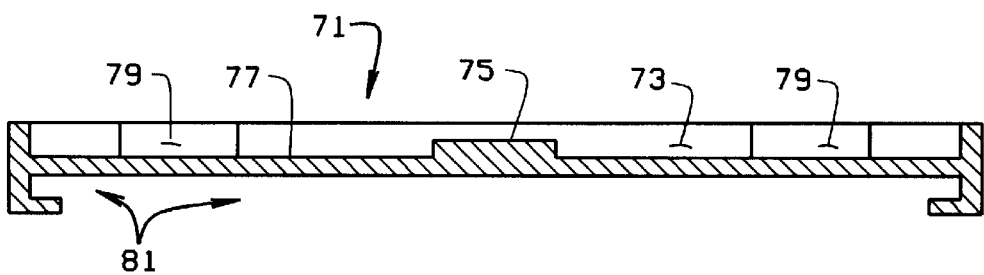
FIG. 7A is a cross-sectional view of the holder of FIG. 7.

Turning now to FIGS. 7 and 7A, there is shown a disk holder 71 particularly suited for use with CD-rom or audio compact disks. More particularly, disk holder 71 preferably has exterior dimensions of approximately 5⅛"×5⅛"×³⁄₁₆" and a centrally disposed circular recess 73 approximately 4¾" in diameter. A hub 75 is centrally located in recess 73 and extends upwardly from the base 77 to accommodate the central opening on CD-rom and audio compact disks.

Arranged around the periphery of recess 73 are four equidistantly spaced openings or thumbholds 79 to facilitate removal of the CD-rom or audio compact disk from recess 73. Turning to FIG. 7A, holder 71 includes an open-faced slot 81 disposed on the bottom thereof to accommodate musical program notes or the like.

It should be understood that a stack of holders 71 can be used with the storage system of FIG. 3, as described above.

It should be realized that the various embodiments and dimensions described herein are illustrative and are not intended in a limiting sense. Various constructions and systems could be made which fall within the scope of the present invention as defined by the attached claims.

What is claimed is:

1. A disk holder for mechanically retaining a computer disk, or audio compact disk comprising an integral frame having a base and upright walls, each upright wall having a top, the tops of said upright walls being substantially coplanar, a recess surrounded by said upright walls and defined by said base and said walls, said recess being disposed below the tops of said upright walls and above the base, said walls being disposed such that they retain a computer disk and/or audio compact disk disposed in the recess in place therein, said frame further including attachment means for removably securing said frame to various structures said base being comprised of a plurality of ribs extending inwardly from the upright walls, said upright walls being disposed to provide a friction fit at the periphery of a disk disposed in said recess such that said disk is held against movement solely by the upright walls along its periphery.

2. The disk holder as set forth in claim 1 further including interior walls extending upwardly from said base, said interior walls being completely disposed in said recess defined by said upright walls and said base, said interior walls defining a second recess sized to frictionally retain a second, smaller computer disk and/or audio compact disk therein.

3. The disk holder as set forth in claim 2 wherein the interior walls are shorter in height than the upright walls forming the first recess.

4. The disk holder as set forth in claim 2 wherein the interior walls are generally parallel to said upright walls forming the first recess.

5. The disk holder as set forth in claim 2 wherein the interior walls form a continuous outline of the second recess.

6. The disk holder as set forth in claim 2 wherein the interior walls form a discontinuous outline of the second recess.

7. The disk holder as set forth in claim 2 wherein the interior walls form a generally rectangular recess.

8. The disk holder as set forth in claim 2 wherein the interior walls form a generally circular recess.

9. The disk holder as set forth in claim 2 further including means defining a third recess for frictionally retaining a computer disk and/or audio compact disk of a third size.

10. The disk holder as set forth in claim 9 wherein the means for retaining the third size computer disk and/or audio compact disk is an extension of the interior walls.

11. The disk holder as set forth in claim 9 wherein at least a portion of the interior walls form a base for the recess for retaining computer disk and/or audio compact disk of the third size.

12. The disk holder as set forth in claim 9 wherein the recess for the computer disk and/or audio compact disk of the third size is of a different shape than the second recess.

13. The disk holder as set forth in claim 9 wherein the recess for the computer disk and/or audio compact disk of the third size is smaller than the recess defined by said upright walls.

14. A storage system for a plurality of computer disk or audio compact disks comprising:

a foundation member;

a plurality of disk holders forming a stack of said holders, each holder having an integral frame with a base and upright walls, each upright wall having a top, the tops of said upright walls being substantially coplanar, a recess surrounded by said upright walls and defined by said base and said walls, said recess being disposed below the tops of said upright walls and above the base, said walls being disposed such that they retain a disk disposed in the recess in place therein, said base being comprised of a plurality of ribs extending inwardly from the upright walls, said upright walls being disposed to provide a friction fit at the periphery of a disk disposed in said recess such that said disk is held against movement solely by the upright walls along its periphery;

securing means for removably securing each disk holder to the foundation member; and a cover member, said plurality of disk holders being removably secured by the securing means between the foundation member and a first side of the cover member, said cover member having a second side opposite the first side.

15. The storage system as set forth in claim 14 wherein the foundation member, disk holders, and cover member all have substantially the same overall cross-sectional shape and area.

16. The storage system as set forth in claim 15 wherein the foundation member, disk holders, and cover member are all substantially square.

17. The storage system as set forth in claim 14 wherein each disk holder has means thereon for receiving an identifying label.

18. The storage system as set forth in claim 17 wherein said label receiving means is a notch disposed in one corner of said computer disk and/or audio compact disk holder.

19. The storage system as set forth in claim 17 further including index means for recordal of identifying information for each disk holder in the storage device.

20. The storage system as set forth in claim 14 further including means for removably securing additional disk holders to the cover member on the second side of the cover member, to increase the storage capacity of the storage device.

21. The storage system as set forth in claim 20 further including a second cover member disposed on said second side of the cover member.

* * * * *